US008732825B2

(12) United States Patent  
Park et al.

(10) Patent No.: US 8,732,825 B2
(45) Date of Patent: May 20, 2014

(54) INTELLIGENT HASHES FOR CENTRALIZED MALWARE DETECTION

(75) Inventors: John D. Park, Los Angeles, CA (US); Peter Szor, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 1564 days.

(21) Appl. No.: 12/128,490

(22) Filed: May 28, 2008

(65) Prior Publication Data

US 2009/0300761 A1 Dec. 3, 2009

(51) Int. Cl.
*G06F 11/00* (2006.01)
*G06F 12/14* (2006.01)
*G06F 12/16* (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| | | | | |
|---|---|---|---|---|
| 6,505,160 | B1 * | 1/2003 | Levy et al. | 704/270 |
| 7,020,895 | B2 * | 3/2006 | Albrecht | 726/22 |
| 7,475,427 | B2 * | 1/2009 | Palliyil et al. | 726/24 |
| 7,594,118 | B2 * | 9/2009 | Iwamura | 713/176 |
| 7,636,856 | B2 * | 12/2009 | Gheorghescu et al. | 713/188 |
| 7,854,002 | B2 * | 12/2010 | Mohanan et al. | 726/22 |
| 8,042,184 | B1 * | 10/2011 | Batenin | 726/24 |
| 8,479,174 | B2 * | 7/2013 | Chiriac | 717/136 |
| 8,584,235 | B2 * | 11/2013 | Topan et al. | 726/22 |
| 2004/0064737 | A1 * | 4/2004 | Milliken et al. | 713/201 |
| 2004/0073617 | A1 * | 4/2004 | Milliken et al. | 709/206 |
| 2004/0158741 | A1 * | 8/2004 | Schneider | 713/201 |
| 2005/0010814 | A1 * | 1/2005 | Lim et al. | 713/201 |
| 2007/0240217 | A1 * | 10/2007 | Tuvell et al. | 726/24 |
| 2007/0250716 | A1 * | 10/2007 | Brunk et al. | 713/176 |
| 2008/0244275 | A1 * | 10/2008 | Uner | 713/190 |
| 2009/0313700 | A1 * | 12/2009 | Horne | 726/24 |
| 2010/0011441 | A1 * | 1/2010 | Christodorescu et al. | 726/24 |

FOREIGN PATENT DOCUMENTS

WO WO 2007/117567 A2 10/2007

OTHER PUBLICATIONS

Danilo Bruschi, Lorenzo Martignoni, Mattia Monga, "Code Normalization for Self-Mutating Malware," IEEE Security and Privacy, vol. 5, No. 2, pp. 46-54, Mar.-Apr. 2007, doi:10.1109/MSP.2007.31.*
A Semantics-Based Approach to Malware Detection; Mila Dalla Preda, Saumya Debray, Mihai Christodorescu and Somesh Jha; ACM Transactions on Programming Languages and Systems, vol. 30, No. 5, Article 25, Pub. date: Aug. 2008.*

(Continued)

*Primary Examiner* — Bradley Holder
*Assistant Examiner* — James Turchen
(74) *Attorney, Agent, or Firm* — Fenwick & West LLP

(57) ABSTRACT

A suspicious entity is identified. An intelligent hash for the suspicious entity is generated, wherein the intelligent hash includes a set of metadata that is specific to the suspicious entity and at least some of the metadata is invariant over changes to the suspicious entity. The intelligent hash is transmitted to a server for evaluation of whether the suspicious entity corresponds to the malware entity. The server is adapted to determine whether the suspicious entity corresponds to the malware entity based on the intelligent hash. A result is received from the server specifying whether the suspicious entity corresponds to the malware entity.

19 Claims, 7 Drawing Sheets

(56) References Cited

OTHER PUBLICATIONS

Using Engine Signature to Detect Metamorphic Malware; Mohamed R. Chouchane and Arun Lakhotia; WORM'06, Nov. 3, 2006, Alexandria, Virginia, USA. Copyright 2006 ACM 1-59593-551-7/06/0011.*

PCT International Search Report and Written Opinion, PCT Application No. PCT/US2009/045319, Dec. 9, 2009, 10 pages.

Bailey, M., "Automated Classification and Analysis of Internet Malware," Lecture Notes in Computer Science, Apr. 26, 2007, pp. 1-18.

Baker, B.S. et al., "Deducing Similarities in Java Sources from Bytecodes," USENIX Annual Technical Conference, 1998, 12 pages.

Baker, B.S., "A Theory of Parameterized Pattern Matching: Algorithms and Applications," 25$^{th}$ ACM STOC '93, 1993, pp. 71-80.

Bilar, D., "Fingerprinting Malicious Code through Statistical Opcode Analysis," 2006, 8 pages.

Brin, S. et al., "Copy Detection Mechanism for Digital Documents" International Conference on Management of Data, Proceedings of the 1995 ACM SIGMOD International Conference on Management of Data, 1995, pp. 398-409, ISBN: 0-89791-731-6, San Jose, CA, US.

Flake, H., "Structural Comparison of Executable Objects," Proc. of the International GI Workshop on Detection of Intrusions and Malware & Vulnerability Assessment, No. P-46 in Lecture Notes in Informatics, Dortmund, Germany, Jul. 2004, pp. 161-174.

Heintze, N., "Scalable Document Fingerprinting," Proc. USENIX Workshop on Electronic Commerce, 1996, pp. 1-10.

Lee, T. et al., "Behavioral Classification," Presented at the EICAR Conference, May 2006, pp. 1-17.

Manber, U., "Finding Similar Files in a Large file System," Department of Computer Science, the University of Arizona, Oct. 1993, to appear in the 1994 Winter USENIX Technical Conference, pp. 1-10.

Muttik, I., "Stripping Down an AV Engine," Virus Bulletin Conference, Sep. 2000, pp. 59-68.

Schleimer, S. et al., "Winnowing: Local Algorithms for Document Fingerprinting," SIGMOD 2003, Jun. 9-12, 2003, San Diego, CA, ACM, 10 pages.

Shivakumar, N. et al., "SCAM: A Copy Detection Mechanism for Digital Documents," Annual Conference on the Theory and Practice of Digital Libraries, Jun. 1995, pp. 1-13.

Walenstein, A. et al., "Exploiting Similarity between Variants to Defeat Malware," White Paper for BlackHat DC 2007, Virus Bulletin, Jul. 2007, pp. 1-12.

* cited by examiner

INTELLIGENT HASHES FOR CENTRALIZED MALWARE DETECTION

BACKGROUND OF THE INVENTION

1. Field of the Invention

This invention pertains in general to computer security and in particular to the identification of malware using intelligent hashes.

2. Description of the Related Art

There is a wide variety of malicious software (malware) that can attack modern computers. Malware threats include computer viruses, worms, Trojan horse programs, spyware, adware, crimeware, and phishing websites. Modem malware is often designed to provide financial gain to the attacker. For example, malware can surreptitiously capture important information such as logins, passwords, bank account identifiers, and credit card numbers. Similarly, the malware can provide hidden interfaces that allow the attacker to access and control the compromised computer.

Some security computer systems and software for counteracting malware operate by seeking to identify characteristics of malware that are used to determine whether an entity such as a computer file or a software application contains malware. A hash value, herein referred to as a "hash", is a value generated by applying a transform such as a cryptographic hash function to an entity such as a malware program. A hash value forms a unique representation or "fingerprint" of the malware program which can then be used as a characteristic to identify the program. Common transforms for generating hashes include MD5 and SHA-1.

Cryptographic hash functions are sensitive to small changes in the data (i.e. polymorphisms). Therefore, two similar entities such as variants of the same malware program (i.e. polymorphic malware) may have very different hashes. In this way, hashes are specific to the entity they are generated from. This specificity often causes false negative identifications of polymorphic malware as the data used to generate a hash for one variant of a malware program may be subject to the polymorphisms.

In order to compensate for false negative identifications, several hashes of an entity are used in identifying whether or not the entity is malware. As the number of different malware entities a client can be exposed to continues to increase over time, the number of hashes used to determine whether an entity is malware has grown proportionally. Using a large set of hashes can create inefficiency in scanning an entity such as a software application or file to detect the presence of malware.

Accordingly, there is a need in the art for decreasing the number of hashes used to identify malware without compromising the ability to detect malware on the clients.

BRIEF SUMMARY

The above and other needs are met by methods and computer-readable storage media for generating intelligent hashes for an entity.

One aspect provides a method of generating an intelligent hash for an entity. A sequence of assembly language instructions is generated based on the entity. A set of subsequences of the sequence of assembly language instructions is identified. The intelligent hash for the entity is generated based, at least in part, on the identified set of subsequences and stored on a storage device.

Another aspect provides a computer system for determining whether a suspicious entity corresponds to a malware entity. The system comprises a reporting module adapted to receive an intelligent hash generated based on a suspicious entity encountered by a client, wherein the intelligent hash includes a set of metadata that is specific to the suspicious entity and at least some of the metadata is invariant over changes to the suspicious entity. The system further comprises an evaluation module adapted to determine whether the suspicious entity corresponds to the malware entity based on the intelligent hash. The reporting module is further adapted to report to the client whether the suspicious entity hash corresponds to the malware entity.

In another aspect the described embodiments provide a computer-readable storage medium encoded with computer program code for determining whether a suspicious entity corresponds to a malware entity. The program code comprises program code for identifying a suspicious entity. The program code further comprises program code for generating an intelligent hash for the suspicious entity, wherein the intelligent hash includes a set of metadata that is specific to the suspicious entity and at least some of the metadata is invariant over changes to the suspicious entity. The program code further comprises program code for transmitting the intelligent hash to a server for evaluation of whether the suspicious entity corresponds to the malware entity. The program code further comprises program code for receiving from the server a result specifying whether the suspicious entity corresponds to the malware entity.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
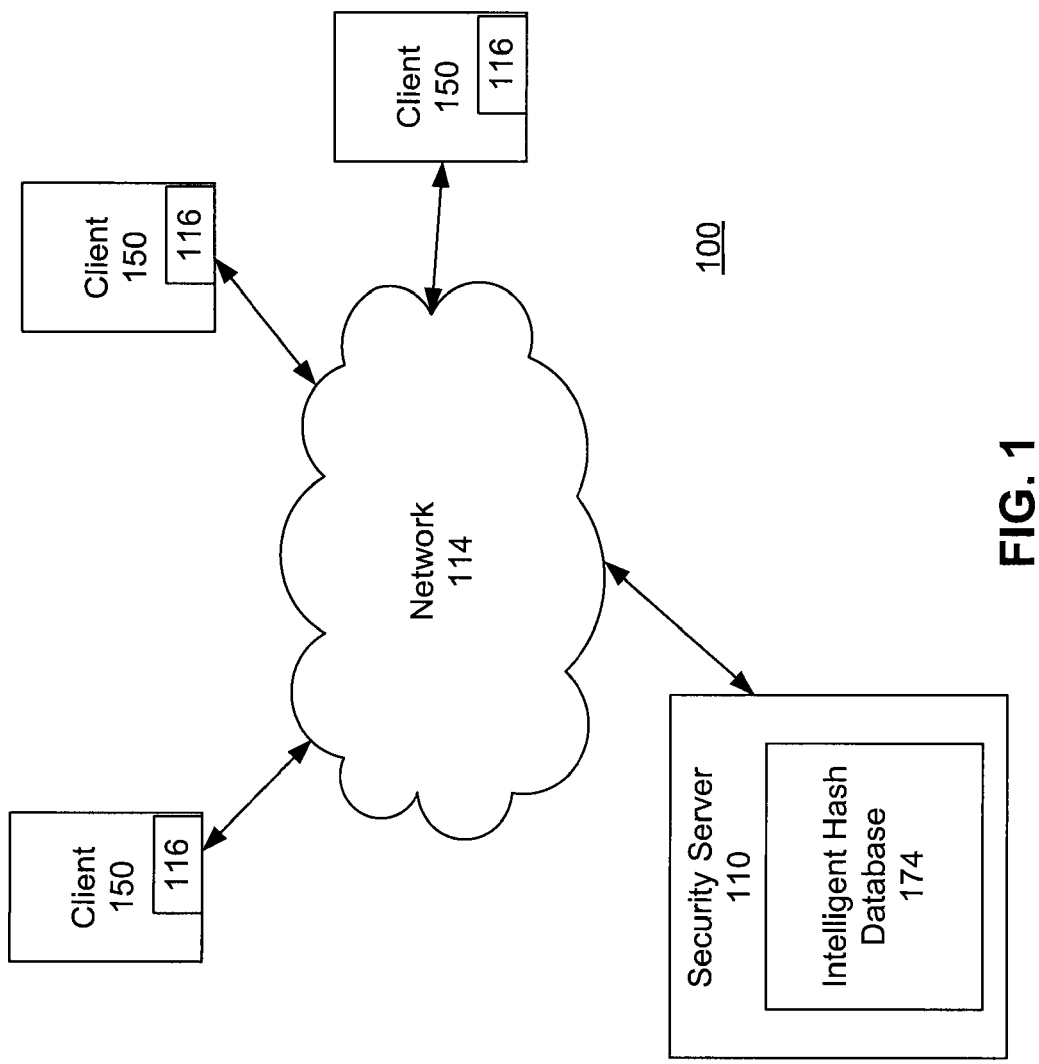
FIG. 1 is a high-level block diagram of a computing environment 100 according to one embodiment.

FIG. 1 is a high-level block diagram of a computing environment 100 according to one embodiment. FIG. 1 illustrates a security server 110 and three clients 150 connected by a network 114. Only three clients 150 are shown in FIG. 1 in order to simplify and clarify the description. Embodiments of the computing environment 100 can have thousands or millions of clients 150 connected to the network 114.

The security server 110 interacts with the clients 150 via the network 114. The security server 110 includes an intelligent hash database 174 storing intelligent hashes used to detect malware. An "intelligent hash" is generated by identifying metadata associated with an entity, such as a file or a software application, that is both unique to the entity (i.e. specific) and largely invariant over small changes to the entity such as polymorphisms (i.e. robust). These metadata can either be extracted from the entity or generated using transformations or functions.

Using these metadata, the intelligent hashes generated from two entities which are variants of the same entity (e.g. are different due to a small number of polymorphisms) will reflect that similarity. The polymorphisms between the two variants of the same entity may result in differences in some of the metadata represented in the intelligent hashes for the two variants of the same entity. However, the majority of the metadata will remain the same reflecting the similarity between the two variants of the same entity. The security server 110 generates intelligent hashes for a comprehensive set of known malware threats and stores the intelligent hashes in the intelligent hash database 174.

The security server 110 uses the intelligent hash database 174 to evaluate whether intelligent hashes generated at clients 150 correspond to intelligent hashes in the intelligent hash database 174. Upon identification of a suspicious entity such as an unknown entity or an entity that is suspected to be malware, the client 150 generates an intelligent hash of the suspicious entity, herein referred to as a "suspicious entity hash". The client 150 then transmits the suspicious entity hash to the security server 110 for evaluation. Upon receiving a suspicious entity hash from a client 150, the security server 110 evaluates the intelligent hash by comparing it to the intelligent hashes in the database 174 to determine whether the suspicious entity hash is the same or similar to the intelligent hashes in the intelligent hash database 174. The security server 110 reports the results of the evaluation back to the client 150.

In one embodiment, a client 150 is a computer used by one or more users to perform activities including downloading, installing, and/or executing software entities. The client 150, for example, can be a personal computer executing a web browser such as MICROSOFT INTERNET EXPLORER that allows the user to retrieve and display content from web servers and other computers on the network 114. In other embodiments, the client 150 is a network-capable device other than a computer, such as a personal digital assistant (PDA), a mobile telephone, a pager, a television "set-top box," etc. For purposes of this description, the term "client" also includes computers such as servers and gateways that encounter software entities or other entities that might constitute malware or other threats. For example, a client 150 can be a network gateway located between an enterprise network and the Internet.

Using the intelligent hash database 174 and other information stored at the security server 110 to evaluate suspicious entity hashes provides a mechanism for centralizing the evaluation of suspicious entities, while still providing for comprehensive client-side malware detection. This approach leverages the processing power of the security server 110 to generate the intelligent hash database 174 and evaluate intelligent hashes received from the clients 150. Thus, the approach is well-suited to computing environments where it is not practical or desirable to transmit intelligent hash databases 174 to the clients 150.

In addition, the use of intelligent hashes in this approach allows for detection of malware entities that have been modified to contain polymorphisms, thus providing a decreased number of false negative evaluations of malware and eliminating the need to produce multiple hashes for each entity. This "intelligent" detection further allows for the determination of a similarity value between two intelligent hashes. This similarity value can be a continuous or percentage-based value which provides a user with the ability to quantify a degree of similarity between two entities, as opposed to traditional hash methods which only provide binary identification. For example, a user may be able to quantify that two intelligent hashes have 90% similarity based on a similarity value which specifies a percentage of matching metadata between the two hashes.

The network 114 represents the communication pathways between the security server 110 and clients 150. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
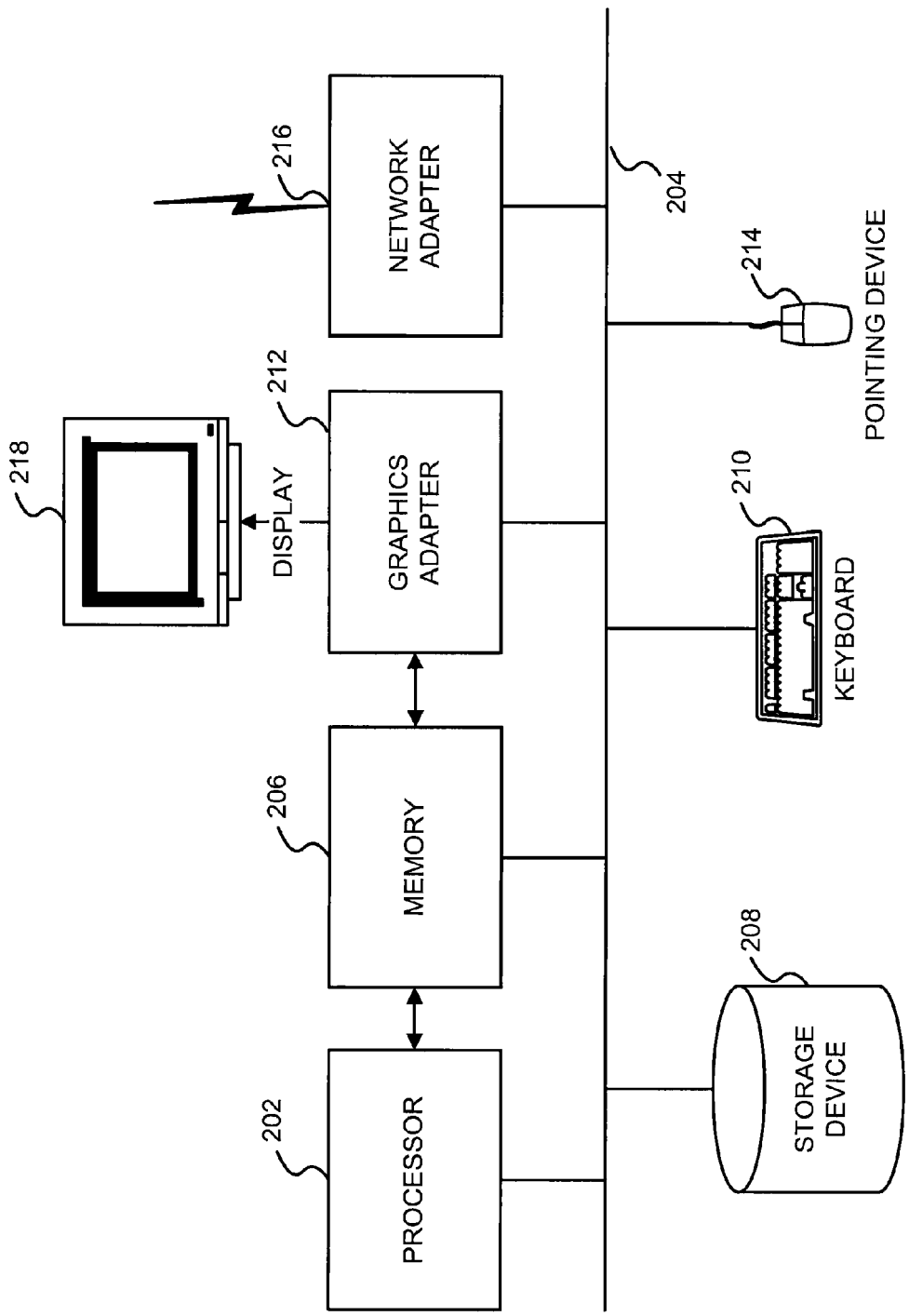
FIG. 2 is a high-level block diagram illustrating a typical computer 200 for use as a security server 110 or client 150.

FIG. 2 is a high-level block diagram illustrating a typical computer 200 for use as a security server 110 or client 150. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 150 that is a mobile telephone typically has limited processing power, a small display 218, and might lack a pointing device 214. The security server 110, in contrast, may comprise multiple blade servers working together to provide the functionality described herein.

Figure 3:
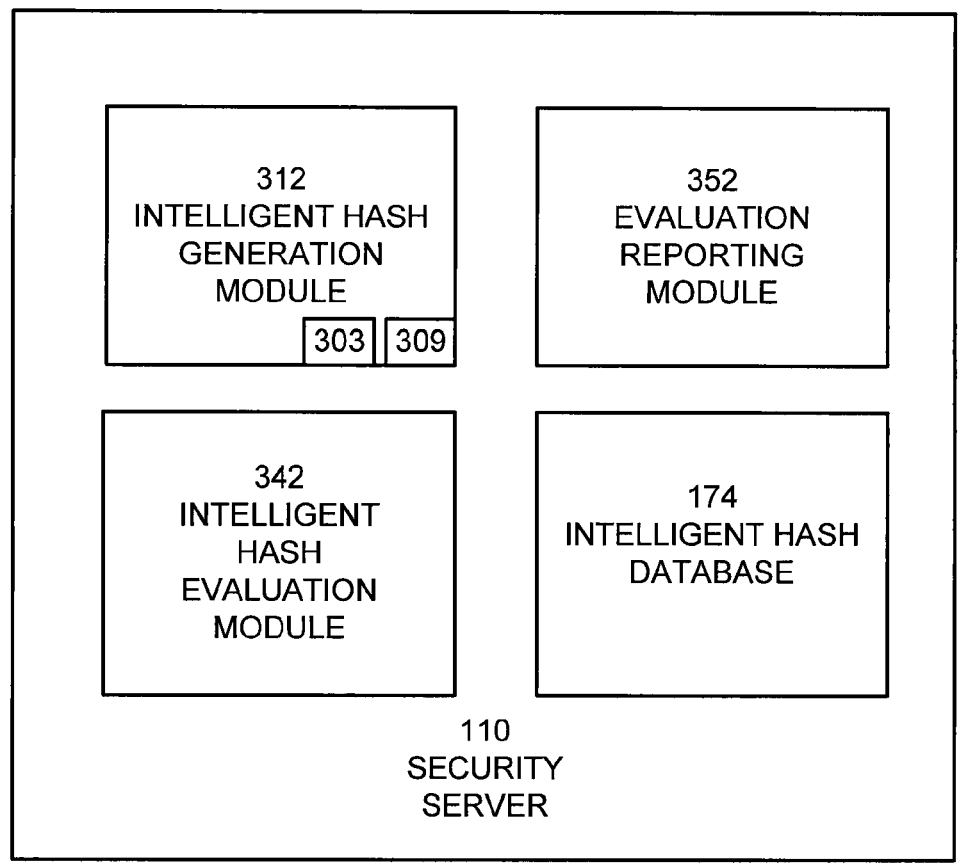
FIG. 3 is a high-level block diagram illustrating a detailed view of the security server 110 according to one embodiment.

FIG. 3 is a high-level block diagram illustrating a detailed view of the security server 110 according to one embodiment. As shown in FIG. 3, the security server 110 includes several modules. Those of skill in the art will recognize that other embodiments can have different and/or other modules than the ones described here, and that the functionalities can be distributed among the modules in a different manner. In addition, the functions ascribed to the security server 110 can be performed by multiple servers.

An evaluation reporting module 352 communicates with the clients 150 via the network 114. The evaluation reporting module 352 receives suspicious entity hashes from the clients 150. The evaluation reporting module 352 communicates with the suspicious entity hash evaluation module 342 to receive results of evaluations of the suspicious entity hashes. The evaluation reporting module 352 further provides the results of evaluations of the suspicious entity hashes to the clients 150.

The intelligent hash generation module 312 analyzes entities such as software applications to identify metadata associated with the entities and generate intelligent hashes based on the identified metadata. The intelligent hash generation module 312 generates intelligent hashes based on different types of metadata derived from the entity including: compression information, a set of frequently occurring metalanguage subsequences and a set of unique strings. In some embodiments, the intelligent hash generation module 312 generates intelligent hashes based on additional metadata or other information associated with or derived from the entity.

The intelligent hash generation module 312 generates compression information for an entity including information specifying one or more algorithms used to compress the entity, herein referred to as "packers". This compression information helps to identify malware threats, as some malware entities (or families of malware entities) are compressed with the same packer(s). In one embodiment, the intelligent hash generation module 312 attempts to decompress the entity by applying a set of known decompression algorithms 303 to the entity. If the intelligent hash generation module 312 is successful in decompressing the entity, compression information for the entity includes the packer that was used to successfully decompress the entity. If the intelligent hash generation module 312 fails to decompress the entity, compression information for the entity includes an indicator that the packer is unknown. According to the embodiment, the compression information generated by the intelligent hash generation module 312 can also include: the size of the entity before and after decompression, whether an emulator or a packer was used to compress the entity and the size of a set of a set of data appended to the entity.

The intelligent hash generation module 312 further generates metalanguage instructions based on the entity. Metalanguage instructions are instructions which are generated based on a transformation of the program code of the entity. In some embodiments, the intelligent hash generation module 312 generates a sequence of metalanguage instructions based on the entity. According to the embodiment, the metalanguage instructions generated by the intelligent hash module 312 can range from high level transformations such as pseudo-code instructions to assembly language instructions. The intelligent hash generation module 312 further determines information based on the metalanguage instructions such as the frequency of each type of instruction.

In one embodiment, the intelligent hash generation module 312 determines a set of subsequences of assembly instructions that frequently occur within the entity. The intelligent hash generation module 312 comprises one or more disassembler programs 309 which convert the entity into a sequence of assembly language instructions. Each instruction in the sequence is herein referred to as an operation code. Suitable disassembler programs can include but are not limited to: the Interactive Disassembler (IDAPro), Sourcer and BDASM. Based on this conversion, the intelligent hash generation module 312 identifies metadata including: the total number of instructions within the sequence of assembly language instructions, the number of blocks of operation codes in the sequence of assembly language instructions, the median number of operation codes per block and cross reference information contained within the sequence of assembly language instructions.

The intelligent hash generation module 312 analyzes the sequence of metalanguage instructions in order to determine a set of the most frequently occurring subsequences of the sequence of metalanguage instructions. In most embodiments, the number of instructions in each subsequence of the set will be a fixed size (e.g. 5 instructions). This fixed size can range from 1-50 instructions. In a specific embodiment, the number of instructions in each subsequence will range from 5 to 10 instructions.

The intelligent hash generation module 312 determines the frequency at which each subsequence occurs in the sequence of metalanguage instructions. In a specific embodiment, the intelligent hash generation module 312 uses a sliding window method to enumerate the frequency at which each subsequence occurs within the sequence of metalanguage instructions. In a sliding window method, a window of a fixed size n is advanced by one instruction or operation code over the sequence to enumerate the number of times each subsequence of length n occurs. Other methods of enumerating a frequency for each subsequence include string matching algorithms and construction of lookup tables.

The intelligent hash generation module 312 selects a set of subsequences that occur most frequently in the sequence of metalanguage instructions for inclusion in the intelligent hash. According to the embodiment and the length of the subsequences, this set of subsequences may range from a single subsequence to several subsequences. Typically, the set will range from 5-15 subsequences. In one embodiment, the intelligent hash generation module 312 selects the set of subsequences which have the highest frequency of occurrence. In other embodiments, the intelligent hash generation module 312 may filter out subsequences of metalanguage instructions that occur with very high frequencies over a large set of entities including entities that are not malware (i.e. are non-informative) before selecting the set of subsequences which have the highest frequency of occurrence.

The intelligent hash generation module 312 further identifies unique strings based on the entity. These unique strings represent information the entity uses to communicate with networks, computer programs and computer systems. These strings can be useful for characterizing the entity based on its communications. Unique strings can include names of libraries or modules the entity communicates with, names of files the entity communicates with, uniform resource locators, internet protocol addresses, email addresses and global unique identifiers (GUIDs) such as class identifiers (CLSIDs)

The intelligent hash generation module 312 identifies unique strings based on structured information such as: extensions indicating libraries or modules the entity communicates with (e.g. dll extensions indicating communications with dynamic link libraries), other file extensions indicating names of files the entity communicates with (e.g. avi), information indicating uniform resource locators, information indicating internet protocol addresses, information indicating email addresses and information indicating global unique identifiers. In one embodiment, the intelligent hash generation module 312 identifies the unique strings using regular expressions designed to identify the structured information.

The intelligent hash generation module 312 selects a set of unique strings for inclusion in the intelligent hash. In some embodiments, the intelligent hash generation module 312 selects all of the unique strings for inclusion in the intelligent hash. In other embodiments, the intelligent hash generation module 312 may limit the number of unique strings based on a fixed size of the intelligent hash (e.g. 750 bytes). Additionally, the unique strings may be filtered or weighted based on unique strings that frequently occur in malware and innocuous entities (i.e. entities that are not malware). In a specific embodiment, a set of frequently occurring strings are generated based on a corpus of innocuous entities and the unique strings are filtered using the set of frequently occurring strings. In some embodiments, the unique strings are given a score which is inversely proportional to their frequency of occurrence over a large set of malware and/or innocuous entities.

The intelligent hash generation module 312 generates the intelligent hashes based on the metadata. The intelligent hash generation module 312 may combine and represent the metadata for the entity in any way to generate the intelligent hashes. Typically, the intelligent hash will be represented as a string of alphanumeric data. According to the embodiment, the intelligent hash generation module 312 generates intelligent hashes that include numeric values such scores, probability values or frequencies associated with the metadata. In one embodiment, the intelligent hash generation module 312 generates the intelligent hashes including the set of most frequently occurring subsequences in association with each subsequence's frequency of occurrence. In some embodiments, the intelligent hash generation module 312 includes a set of weights or frequency values associated with the set of unique strings.

In a specific embodiment the hash generation module 312 represents the intelligent hash as an alphanumeric string such as:

```
42323|1-PECOMPACT-w|123423|32233|I=017253 B=297 M=31 X=1953 |A=1925
C=1154 D=51 G=2221 J=2246 L=789 M=3917 P=4180 R=44 S=125 T=780
V=5 PPPPP=171 LPPPM=111 PPPPG=110 MMMMM=91 PPPMP=88 PAAPA=73 APAAP=71
PPGCJ=69 JCJCJ=68 CJCJC=63 |4233|ntoskrnl.ex ntoskrnl.exe
V2.3.9.0.Demo.CracKed.By is4q.1ih|user32.dll drv\objfre\i386\driver.pdb
objfre\i386\driver.sys kernel32.dll ntdll.dll ws2_32.dll advapi32.dll
```

In the above example, different types of metadata are separated by the delimiter "|". The first type of metadata in the intelligent hash is the size of entity in bytes before decompression. The second type of metadata in the intelligent hash describes the packer(s) used to compress the entity. In this example, the 'w' is used to indicate that an emulator has been used in place of a traditional compression algorithm. The third type of metadata in the intelligent hash is the size of the entity after decompression. The fourth type of metadata in the intelligent hash is the size of data that has been appended to the file. The fifth type of metadata in the intelligent hash includes the total instruction count of the sequence of assembly language instructions (indicated by 'I'), the number of blocks in the sequence of assembly language instructions (indicated by 'B'), the median number of instructions in each block (indicated by 'M') and the number of cross references (indicated by 'X'). The sixth type of metadata in the intelligent hash represents the different operation codes or instructions and their respective frequencies of occurrence in the sequence of assembly language instructions. In this example, "A=1925" represents that the instruction Add occurred 1925 times in the sequence of assembly language instructions. The seventh type of metadata in the intelligent hash represents the 10 most frequently occurring subsequences of assembly language instructions and their respective frequencies of occurrence in the sequence of assembly language instructions. The eighth type of metadata in the intelligent hash represents the number of unique strings identified based on the entity. The ninth type of metadata in the intelligent hash represents the identified unique strings.

The intelligent hash database 174 stores a set of intelligent hashes generated based on a comprehensive set of known malware entities. The intelligent hash database 174 stores the set of intelligent hashes in association with the entities the hashes represent. In some embodiments, the intelligent hash database 174 stores also stores intelligent hashes generated based on entities that are not malware (i.e. innocuous entities).

A suspicious entity hash evaluation module 342 evaluates suspicious entity hashes reported by the clients 150 to determine whether they represent entities that are malware. The suspicious entity hash evaluation module 342 compares the suspicious entity hash with the hashes in the intelligent hash database 174 to determine whether the entity hash is the same or similar to an intelligent hash in the intelligent hash database 174.

In one embodiment, the suspicious entity hash evaluation module 342 generates a similarity score when comparing two intelligent hashes such as the suspicious entity hash and a hash in the intelligent hash database 174. The similarity score may be a binary score indicating whether or not the hashes are similar or a continuous numeric score indicating a range of similarity values such as a percentage similarity. The suspicious entity hash evaluation module 342 generates the similarity score based on the metadata within the two intelligent hashes. In one embodiment, the suspicious entity hash evaluation module 342 generates a similarity score based on a function which provides a single comparison of all the metadata such as a Euclidean distance function or a cosine distance function. In some embodiments, the suspicious entity hash evaluation module 342 generates the similarity score based on a series of comparisons of different types of metadata such as a decision tree algorithm. In some embodiments, the suspicious entity hash evaluation module 342 may use machine learning methods such as neural networks or boosting to generate similarity scores.

In a specific embodiment, the suspicious entity hash evaluation module 342 generates the similarity scores through a pre-determined sequence of comparisons of different types of metadata values. In this embodiment, the suspicious entity hash evaluation module 342 compares in order: the sets of most frequently occurring assembly language subsequences, the frequencies of the sets most frequently occurring assembly language subsequences indicated in the two intelligent hashes, the packer(s) indicated in the intelligent hashes and the unique strings indicated in the intelligent hashes. In one embodiment, the suspicious entity hash evaluation module 342 uses threshold values to determine whether to proceed to the next step in the comparison. For instance, the suspicious entity hash evaluation module 342 may determine that two hashes are not similar based on the set of most frequently occurring assembly language subsequences having less than 80% agreement.

The suspicious entity hash evaluation module 342 determines the intelligent hash with highest similar score and the entity associated with the intelligent hash in the intelligent hash database 174. The suspicious entity hash evaluation module 342 communicates the results of the evaluation to the evaluation reporting module 352, the results including: the entity associated with the highest scoring intelligent hash, whether the highest similarity score is above the similarity cutoff value and whether the entity associated with the highest scoring intelligent hash is a malware entity or an innocuous entity. In some embodiments, the suspicious entity hash evaluation module 342 may report the results of an evaluation to an administrator of the security server 110 for further evaluation.

Figure 4:
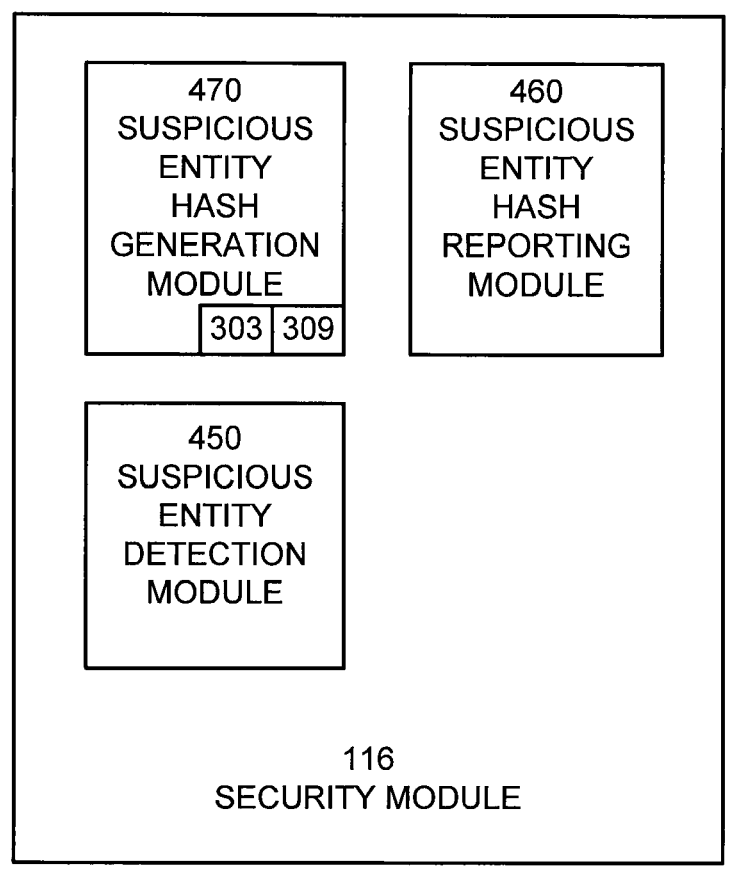
FIG. 4 is a high-level block diagram illustrating a detailed view of the security module 116 according to one embodiment.

FIG. 4 is a high-level block diagram illustrating a detailed view of the security module 116 of a client 150 according to one embodiment. In some embodiments, the security module 116 is incorporated into an operating system executing on the client 150 while in other embodiments the security module 116 is a standalone entity or part of another product. As shown in FIG. 4, the security module 116 includes multiple modules. Those of skill in the art will recognize that other embodiments of the security module 116 can have different and/or other modules than the ones described here, and that the functionalities can be distributed among the modules in a different manner.

A suspicious entity detection module 450 detects suspicious entities. In one embodiment, the suspicious entity detection module 450 scans the storage device 208 or memory 206 associated with the client 150 to detect suspicious entities installed or stored on the storage device 208 or memory 206. In another embodiment, the suspicious entity detection module 450 can detect suspicious entities only when an entity is accessed or executed by a user.

According to the embodiment, the suspicious entity detection module 450 can detect suspicious entities using different methods. In one embodiment, the suspicious entity detection module 450 can identify that the entity is unknown by accessing a list of entities that have been previously evaluated or otherwise determined to be innocuous. In another embodiment, the suspicious entity detection module 450 can scan the client 150 using a set of malware signatures or hashes to detect suspicious entities. In some embodiments, the suspicious entity detection module 450 monitors the behaviors of the entities on the client 150 to determine whether any of the behaviors satisfy behaviors specified in a set of malware signatures.

Upon determining that an entity is a suspicious entity, an embodiment of the suspicious entity detection module 450 quarantines the suspicious entity to prevent the entity from damaging the client 150. The suspicious entity may be quarantined, for example, by configuring the client 150 to prohibit execution of it and/or taking another action to prevent any malicious code in the suspicious entity from causing harm.

The suspicious entity hash generation module 470 functions to generate intelligent hashes for the suspicious entities (i.e. suspicious entity hashes). The suspicious entity hash generation module 470 generates suspicious entity hashes that include metadata derived according to the methods outlined above in reference to the intelligent hash generation module 312. The suspicious entity hash generation module 470 communicates the generated suspicious entity hashes to the suspicious entity hash reporting module 460.

The suspicious entity hash reporting module 460 communicates with the security server 110 via the network 114. The suspicious entity hash reporting module 460 reports suspicious entity hashes to the security server 110. The suspicious entity hash reporting module 460 receives results of the suspicious entity hash evaluations from the security server 110. The results of the suspicious entity hash evaluations include: the entity associated with the highest scoring intelligent hash, whether the highest similarity score is above the similarity cutoff value and whether the entity associated with the highest scoring intelligent hash is a malware entity or an innocuous entity. If the evaluation indicates that a signature detection event is not malware (i.e. the highest scoring intelligent hash is above the similarity cutoff value and is not associated with a malware entity), the suspicious entity hash reporting module 460 communicates instructions to the suspicious entity detection module 450 to suppress (e.g., to ignore) the signature detection event. Thus, the suspicious entity hash reporting module 460 will release the entity from quarantine and/or undo other actions performed when the entity was declared suspicious.

If the suspicious entity hash evaluation indicates that the entity is malware (i.e. the highest scoring intelligent hash is above the similarity cutoff value and is associated with a malware entity), the suspicious entity hash reporting module 460 remediates the client 150, for example, by removing the suspicious entity and/or repairing corrupted entities on the client 150. The suspicious entity hash reporting module 460 may perform additional actions, such as alerting a user of the client 150 and logging the suspicious entity.

Figure 5:
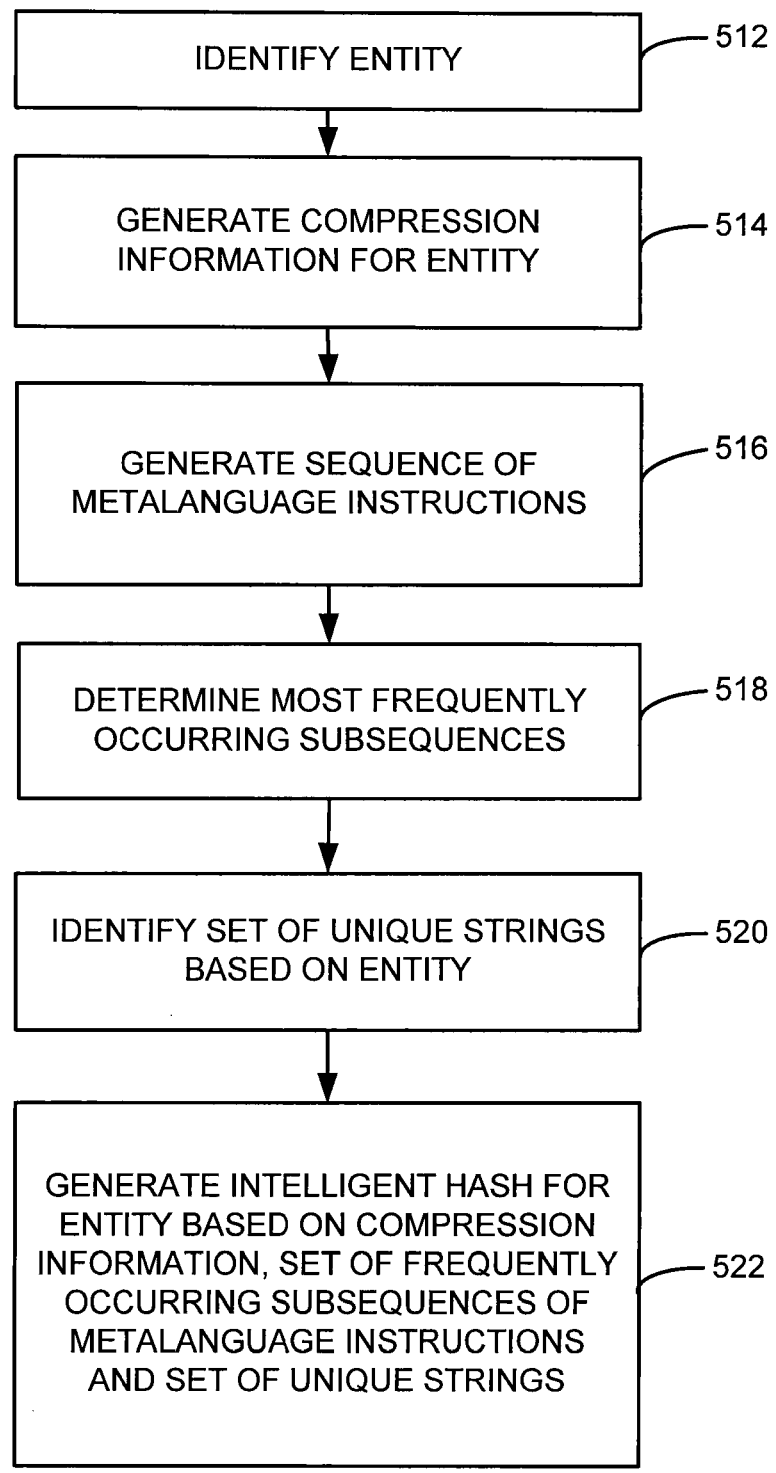
FIG. 5 is a flowchart illustrating steps performed by the security server 110 to generate an intelligent hash according to one embodiment.

FIG. 5 is a flowchart illustrating steps performed by the security server 110 to generate intelligent hashes according to one embodiment. Other embodiments perform the illustrated steps in different orders, and/or perform different or additional steps. Moreover, some of the steps can be performed by engines or modules other than the security server 110.

The security server 110 identifies 512 an entity such as software application or a file. The security server 110 generates 514 compression information for the entity by applying a set of decompression algorithms 303 to the entity. The security server 110 generates 516 a sequence of assembly language instructions by applying one or more dissembler algorithms 309 to the entity. The security server 110 determines 518 a set of most frequently occurring subsequences of the sequence of assembly language instructions. The security server 110 identifies 520 a set of unique stings based on the entity. The security server 110 generates 522 an intelligent hash for the entity based on the compression information, the set of frequently occurring subsequences of assembly language instructions and the set of unique strings.

Figure 6:
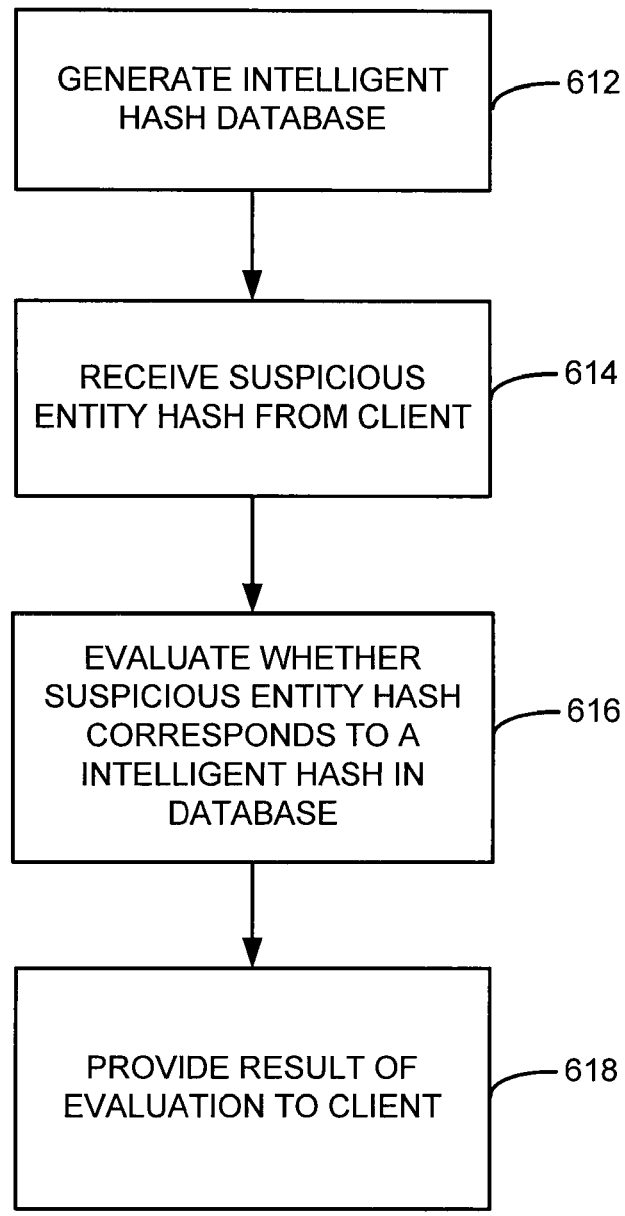
FIG. 6 is a flowchart illustrating steps performed by the security server 110 to evaluate a suspicious entity hash according to one embodiment.

FIG. 6 is a flowchart illustrating steps performed by the security server 110 to provide evaluations of suspicious entity hashes to a client 150 according to one embodiment. Other embodiments perform the illustrated steps in different orders, and/or perform different or additional steps. Moreover, some of the steps can be performed by engines or modules other than the security server 110.

The security server 110 generates 612 an intelligent hash database 174. The security server 110 receives 614 a suspicious entity hash from a client 150. The security server 110 evaluates 616 whether the suspicious entity hash corresponds to a hash in the intelligent hash database 174. The security server 110 provides 618 the results of this evaluation to the client 150.

Figure 7:
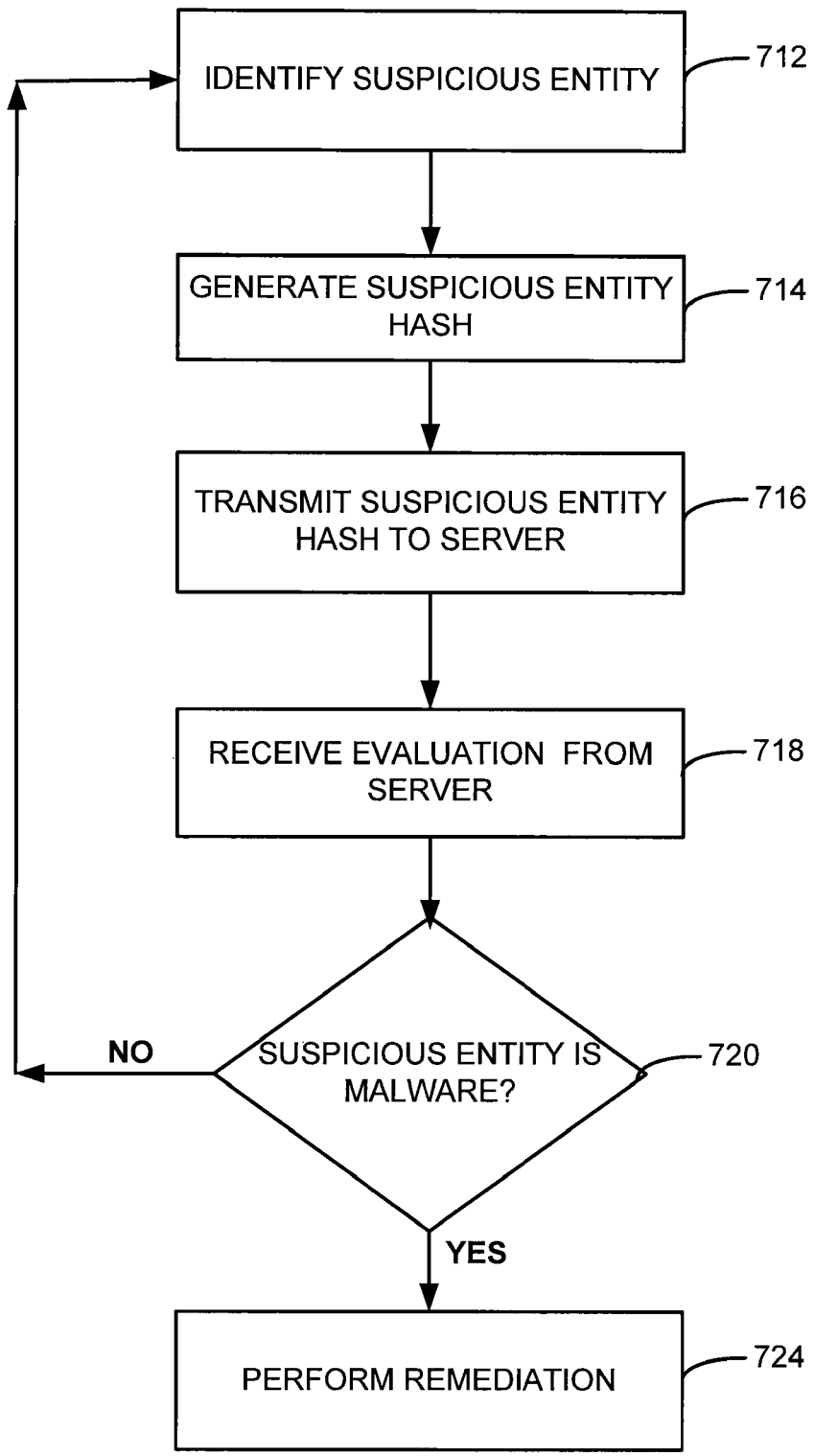
FIG. 7 is a flowchart illustrating steps performed by the security module 116 to identify and evaluate suspicious entities according to one embodiment.

FIG. 7 is a flowchart illustrating steps performed by the security module 116 on the client 150 to detect and evaluate suspicious entities according to one embodiment. Other embodiments perform the illustrated steps in different orders, and/or perform different or additional steps. Moreover, some of the steps can be performed by engines or modules other than the security module 116.

The security module 116 identifies 712 a suspicious entity. The security module 116 generates 714 a suspicious entity hash. The security module 116 transmits 616 the suspicious entity hash to the security server 110. The security module 116 receives 618 an evaluation of the suspicious entity hash from the security server 110, the evaluation indicating whether the suspicious entity hash has a high similarity to an intelligent hash for a malware entity or an innocuous entity. If 720 the evaluation indicates that the suspicious entity is innocuous or not similar to known malware, the security module 116 continues to identify 712 suspicious entities. If 720 the evaluation indicates that the suspicious entity is malware, the security module 116 performs 724 a remediation of the client 150, such as removing the suspicious entity from the client.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of generating an intelligent hash for an entity, the method comprising:
a computer processor:
identifying the entity, wherein the entity is a file;
generating a sequence of metalanguage instructions based on transformations of program code of the entity, the sequence of metalanguage instructions comprising at least one of: a high level transformation of the program code and an assembly language instruction;
determining a plurality of frequency values for a plurality of subsequences of the sequence of metalanguage instructions, wherein a frequency value indicates a frequency at which an associated subsequence occurs in the sequence of metalanguage instructions based on transformations of program code of the entity;
selecting a set of subsequences from the plurality of subsequences based at least in part on the plurality of frequency values;
generating the intelligent hash for the entity based, at least in part, on the selected set of subsequences, wherein the intelligent hash is unique to the entity and is partially invariant to changes to the entity; and
storing the intelligent hash on a storage device.

2. The method of claim 1, wherein frequency values of the selected subsequences indicate that the subsequences occur with higher frequency in the sequence of metalanguage instructions than non-selected subsequences.

3. The method of claim 1, wherein generating an intelligent hash for the entity further comprises:
identifying a technique used to compress the entity;
defining information describing the technique used to compress the entity; and
generating the intelligent hash for the entity based, at least in part, on the information describing the identified technique.

4. The method of claim 1, wherein generating an intelligent hash for the entity further comprises:
identifying a set of unique strings based on the entity;
defining information describing the set of unique strings; and
generating the intelligent hash for the entity based, at least in part, on information describing the set of unique strings.

5. The method of claim 4, wherein identifying the set of unique strings based on the entity comprises identifying a set of strings indicating communications between the entity and a computer system.

6. The method of claim 4, wherein identifying the set of unique strings based on the entity comprises identifying a set of strings indicating communications performed by the entity through a network.

7. The method of claim 1, further comprising:
transmitting the intelligent hash to a server for evaluation of whether the entity corresponds to a malware entity; and
receiving from the server a result specifying whether the entity corresponds to the malware entity.

8. A computer system for determining whether a suspicious entity corresponds to a malware entity, the system comprising:
a non-transitory computer-readable storage medium storing executable code comprising:
a hardware or software reporting module adapted to receive an intelligent hash generated based, at least in part, on a set of subsequences of a sequence of metalanguage instructions generated based on transformations of program code of a suspicious entity encountered by a client, the sequence of metalanguage instructions comprising at least one of: a high level transformation of the program code and an assembly language instruction, wherein the suspicious entity is a file, the intelligent hash uniquely identifies the suspicious entity, and the intelligent hash is partially invariant to changes to the suspicious entity, the set of subsequences selected from a plurality of subsequences of the sequence of metalanguage instructions based, at least in part, on a plurality of frequency values indicating frequencies at which associated subsequences occur in the sequence of metalanguage instructions; and
a hardware or software evaluation module adapted to determine whether the suspicious entity corresponds to the malware entity based on the intelligent hash;
wherein the reporting module is further adapted to report to the client whether the suspicious entity hash corresponds to the malware entity; and
a computer processor for executing the executable code.

9. The computer system of claim 8, further comprising:
an intelligent hash database adapted to store a plurality of intelligent hashes;
wherein the evaluation module is further adapted to:

generate a plurality of similarity scores based on the intelligent hash generated based on the suspicious entity and the plurality of intelligent hashes, wherein a similarity score is generated through comparisons of subsequences of the sequence of metalanguage instructions included in the received intelligent hash with a plurality of subsequences of a sequence of metalanguage instructions included in an intelligent hash of the plurality of intelligent hashes and indicates a similarity between the intelligent hash generated based on the suspicious entity and the intelligent hash of the plurality of intelligent hashes; and determine whether the suspicious entity hash corresponds to the malware entity based on an intelligent hash associated with a highest similarity score of the plurality of similarity scores.

10. The computer system of claim 8, further comprising:
a hardware or software intelligent hash generation module adapted to generate an intelligent hash based on the malicious entity.

11. The computer system of claim 8, wherein frequency values of the selected subsequences indicate that the subsequences occur with higher frequency in the sequence of metalanguage instructions than non-selected subsequences.

12. The computer system of claim 10, wherein the intelligent hash generation module is further adapted to:
identify a technique used to compress the malicious entity;
define information describing the technique used to compress the malicious entity; and
generate the intelligent hash for the malicious entity based, at least in part, on the information describing the identified technique.

13. The computer system of claim 10, wherein the intelligent hash generation module is further adapted to:
identify a set of unique strings based on the malicious entity;
define information describing the set of unique strings; and
generate the intelligent hash for the malicious entity based, at least in part, on information describing the set of unique strings.

14. The computer system of claim 9, wherein the similarity score is a continuous numeric score quantifying a degree of similarity between the received intelligent hash and the intelligent hash of the plurality of intelligent hashes.

15. A non-transitory computer-readable storage medium encoded with executable computer program code for determining whether a suspicious entity corresponds to a malware entity, the program code comprising program code for:
identifying a suspicious entity, wherein the suspicious entity is a file;
generating a sequence of metalanguage instructions based on transformations of program code of the suspicious entity, the sequence of metalanguage instructions comprising at least one of: a high level transformation of the program code and an assembly language instruction;
determining a plurality of frequency values for a plurality of subsequences of the sequence of metalanguage instructions, wherein a frequency value indicates a frequency at which an associated subsequence occurs in the sequence of metalanguage instructions based on transformations of program code of the suspicious entity;
selecting a set of subsequences from the plurality of subsequences based at least in part on the plurality of frequency values;
generating an intelligent hash for the suspicious entity based, at least in part, on the selected set of subsequences, wherein the intelligent hash is unique to the suspicious entity and is partially invariant to changes to the suspicious entity;
transmitting the intelligent hash to a server for evaluation of whether the suspicious entity corresponds to the malware entity; and
receiving from the server a result specifying whether the suspicious entity corresponds to the malware entity.

16. The non-transitory computer-readable storage medium of claim 15, wherein frequency values of the selected subsequences indicate that the subsequences occur with higher frequency in the sequence of metalanguage instructions than non-selected subsequences.

17. The non-transitory computer-readable storage medium of claim 15, wherein program code for generating the intelligent hash for the suspicious entity further comprises program code for:
identifying an algorithm used to compress the suspicious entity; and
generating the intelligent hash for the suspicious entity based, at least in part, on information indicating the algorithm.

18. The non-transitory computer-readable storage medium of claim 15, wherein program code for generating the intelligent hash for the suspicious entity further comprises program code for:
identifying a set of unique strings based on the suspicious entity; and
generating the intelligent hash for the suspicious entity based, at least in part, on information indicating the set of unique strings.

19. The non-transitory computer-readable storage medium of claim 15, further comprising program code for:
remediating a client responsive to receiving a result specifying the suspicious entity corresponds to the malware entity.

* * * * *